(12) United States Patent
Lin et al.

(10) Patent No.: US 12,316,532 B2
(45) Date of Patent: May 27, 2025

(54) ADDRESS SYNCHRONIZATION METHOD, SWITCHES, CROSS-DEVICE LINK AGGREGATION SYSTEM, AND STORAGE MEDIUM

(71) Applicant: ZTE CORPORATION, Shenzhen (CN)

(72) Inventors: Ning Lin, Shenzhen (CN); Rong Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 12 days.

(21) Appl. No.: 18/294,367

(22) PCT Filed: Jul. 28, 2022

(86) PCT No.: PCT/CN2022/108684
§ 371 (c)(1),
(2) Date: Feb. 1, 2024

(87) PCT Pub. No.: WO2023/011317
PCT Pub. Date: Feb. 9, 2023

(65) Prior Publication Data
US 2024/0348535 A1  Oct. 17, 2024

(30) Foreign Application Priority Data
Aug. 2, 2021 (CN) .......... 202110880482.4

(51) Int. Cl.
  *G06F 15/16* (2006.01)
  *H04L 45/00* (2022.01)
  *H04L 45/24* (2022.01)
(52) U.S. Cl.
  CPC ............ *H04L 45/245* (2013.01); *H04L 45/66* (2013.01)

(58) Field of Classification Search
  CPC .............................. H04L 45/66; H04L 45/245
  (Continued)

(56) References Cited

U.S. PATENT DOCUMENTS 6,604,136 B1 * 8/2003 Chang .................... H04L 47/24
                                                    709/229
6,708,210 B2 * 3/2004 Chang .................. G06F 12/023
                                                    709/229

(Continued)

FOREIGN PATENT DOCUMENTS

CN      103338161 A    10/2013
CN      107707690 A     2/2018
(Continued)

OTHER PUBLICATIONS

European Patent Office. Extended European Search Report for EP Application No. 22852031.8, mailed Jun. 4, 2024, pp. 1-5.
(Continued)

*Primary Examiner* — Moustafa M Meky
(74) *Attorney, Agent, or Firm* — Vivacqua Crane, PLLC (57) ABSTRACT

Disclosed are a Media Access Control (MAC) address synchronization method, a switch, a Multi-Chassis Link Aggregation Group (MC-LAG) system, and a storage medium. The method may include: comparing a number of dynamic MAC addresses in the first device with a first preset threshold to obtain a first comparison result; adjusting the number of the dynamic MAC addresses in the first device according to the first comparison result; synchronizing the first device with the second device; comparing a sum of a number of dynamic MAC addresses in the second device and a number of static MAC addresses in the second device with a second preset threshold to obtain a second comparison result; adjusting the number of the dynamic MAC addresses in the second device according to the second (Continued)

comparison result; and synchronizing the first device with the second device.

20 Claims, 7 Drawing Sheets

(58) Field of Classification Search
USPC ........................................................ 709/238
See application file for complete search history.

(56) References Cited

U.S. PATENT DOCUMENTS

| | | | | |
|---|---|---|---|---|
| 8,549,517 | B2* | 10/2013 | Koma | H04L 61/5061 |
| | | | | 718/1 |
| 9,019,812 | B2* | 4/2015 | Pu | H04L 12/437 |
| | | | | 370/242 |
| 9,513,750 | B2* | 12/2016 | Biswas | H04L 45/245 |
| 9,654,384 | B2* | 5/2017 | Biswas | H04L 45/245 |
| 9,749,173 | B2* | 8/2017 | Gautam | H04L 69/22 |
| 9,942,163 | B2* | 4/2018 | Cui | H04L 45/66 |
| 10,721,132 | B2* | 7/2020 | Kurian | H04L 41/0816 |
| 11,888,741 | B2* | 1/2024 | Tamizkar | H04L 45/742 |
| 2003/0172147 | A1* | 9/2003 | Chang | H04L 9/40 |
| | | | | 711/E12.006 |
| 2007/0268915 | A1 | 11/2007 | Zelig et al. | |
| 2010/0162241 | A1* | 6/2010 | Koma | H04L 61/5061 |
| | | | | 718/1 |
| 2012/0099574 | A1* | 4/2012 | Tamura | H04L 45/36 |
| | | | | 370/338 |
| 2013/0064075 | A1* | 3/2013 | Pu | H04L 12/4641 |
| | | | | 370/225 |
| 2014/0247829 | A1* | 9/2014 | Gautam | H04L 45/245 |
| | | | | 370/392 |
| 2014/0294010 | A1* | 10/2014 | Biswas | H04L 61/103 |
| | | | | 370/392 |
| 2015/0334038 | A1* | 11/2015 | Cui | H04L 45/66 |
| | | | | 370/412 |
| 2017/0012863 | A1* | 1/2017 | Biswas | H04L 61/103 |
| 2017/0034717 | A1* | 2/2017 | Yuan | H04W 28/18 |
| 2017/0126436 | A1 | 5/2017 | Du et al. | |
| 2019/0280936 | A1* | 9/2019 | Kurian | H04L 41/12 |
| 2021/0051115 | A1 | 2/2021 | Annamary et al. | |
| 2021/0258255 | A1* | 8/2021 | Tamizkar | H04L 45/742 |

FOREIGN PATENT DOCUMENTS

| | | |
|---|---|---|
| CN | 109842694 A | 6/2019 |
| CN | 112202678 A | 1/2021 |
| CN | 112769587 A | 5/2021 |
| EP | 1925128 A1 | 5/2008 |
| WO | 2007031391 A1 | 3/2007 |

OTHER PUBLICATIONS

International Searching Authority. International Search Report and Written Opinion for PCT Application No. PCT/CN2022/108684 and English translation, mailed Oct. 26, 2022, pp. 1-12.

* cited by examiner

ADDRESS SYNCHRONIZATION METHOD, SWITCHES, CROSS-DEVICE LINK AGGREGATION SYSTEM, AND STORAGE MEDIUM

CROSS-REFERENCE TO RELATED APPLICATION

This application is a national stage filing under 35 U.S.C. § 371 of international application number PCT/CN2022/108684, filed Jul. 28, 2022, which claims priority to Chinese patent application No. 202110880482.4, filed Aug. 2, 2021. The contents of these applications are incorporated herein by reference in their entirety.

TECHNICAL FIELD

Embodiments of the present disclosure relate to, but not limited to, the technical field of communication, and more particularly, to a Multi-Chassis Link Aggregation Group (MC-LAG) Media Access Control (MAC) address synchronization method, a switch, a Multi-Chassis Link Aggregation Group (MC-LAG) system, and a storage medium.

BACKGROUND

Devices in Multi-Chassis Link Aggregation Group (MC-LAG) systems generally exist independently, so information in these devices needs to be synchronized. Using Media Access Control (MAC) address synchronization in a switch system as an example, one switch in the system learns a new MAC address, writes this MAC address into a MAC table as a dynamic MAC address, and then sends information about this MAC address to another switch through a peer-link interface, and the another switch writes the received MAC address into its own MAC table as a static MAC address, and vice versa.

A MAC address number limit is usually configured in an MC-LAG switch system. When the number of addresses in the MAC table of each of two switches exceeds the MAC address number limit, the two switches delete their respective MAC addresses so as not to exceed the MAC address number limit.

In some cases, to meet the requirement of the MAC address number limit, the two switches randomly delete their respective MAC addresses. Then, the two switches disable the MAC address learning function and perform address synchronization with each other. However, in this synchronization process, the number of MAC addresses in each switch is likely to exceed the limit again, resulting in network transmission errors.

SUMMARY

The following is a summary of the subject matter set forth in this description. This summary is not intended to limit the scope of protection of the claims.

Embodiments of the present disclosure provide a MAC address synchronization method, a switch, an MC-LAG system, and a storage medium. Two switches forming an MC-LAG switch system use different deletion policies, such that MAC addresses in the two switches after deletion are consistent, and the number of MAC addresses in each of the switches after synchronization does not exceed a MAC address number limit value configured by a user.

In accordance with a first aspect of the present disclosure, an embodiment provides a MAC address synchronization method, applied to an MC-LAG system including a first device and a second device, the method including: comparing a number of dynamic MAC addresses in the first device with a first preset threshold to obtain a first comparison result; adjusting the number of the dynamic MAC addresses in the first device according to the first comparison result; synchronizing the first device with the second device; comparing a sum of a number of dynamic MAC addresses in the second device and a number of static MAC addresses in the second device with a second preset threshold to obtain a second comparison result; adjusting the number of the dynamic MAC addresses in the second device according to the second comparison result; and synchronizing the first device with the second device.

In accordance with a second aspect of the present disclosure, an embodiment provides an MC-LAG system, including a memory, a processor, and computer programs stored in the memory and executable by the processor which, when executed by the processor, causes the processor to implement the MAC address synchronization method in accordance with the first aspect.

In accordance with a third aspect of the present disclosure, an embodiment provides a computer-readable storage medium, storing computer-executable instructions which, when executed by a processor, causes the processor to implement the MAC address synchronization method in accordance with the first aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

DETAILED DESCRIPTION

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order The steps shown in the flowcharts of the drawings may be performed in a computer system including, for example, a set of computer-executable instructions. Also, although a logical order is shown in the flowcharts, in some cases the steps shown or described may be performed in an order different from the orders as shown or described herein.

MC-LAG is a mechanism of realizing multi-chassis link aggregation, which aggregates links of one device and two other devices, to improve the link reliability from the board level to the device level and form an active-active system. The devices involved in link aggregation may be network devices such as switches or routers. The embodiments of the present disclosure will be described using switches as an example, but those having ordinary skills in the art should understand that the address synchronization method described in the present disclosure is also applicable to an MC-LAG system composed of other network devices.

Using switches as an example, because typically two switches in an MC-LAG switch system exist independently, it is necessary to synchronize MAC addresses of the two switches to ensure the consistency of MAC addresses in the two switches. A MAC address number limit is configured in the MC-LAG switch system. When the number of addresses in the MAC table of each of the switches exceeds the MAC address number limit, the switches delete their respective MAC addresses so as not to exceed the MAC address number limit.

Two deletion methods are commonly used.

In one method, the two switches randomly delete their respective MAC addresses to meet the requirement of the address number limit, then disable the MAC address learning function, and synchronize MAC addresses with each other.

In the other method, the two switches randomly delete their respective dynamic MAC addresses, such that their respective dynamic MAC addresses meet the requirement of the address number limit, then disable the MAC address learning function, and synchronize MAC addresses with each other.

However, both the two methods have the following defects. First, when the two switches randomly delete their respective MAC addresses, it cannot be ensured that MAC addresses maintained by the two switches are consistent. Second, whether the two switches delete MAC addresses randomly or delete dynamic MAC addresses only, address synchronization may need to be performed after the deletion. After the synchronization, the number of MAC addresses in each switch may still exceed the address number limit, leading to network transmission errors and affecting the network stability.

In view of the above, the embodiments of the present disclosure provide a MAC address synchronization method. In the method, when a number of dynamic MAC addresses in a first device excesses an address number threshold, the first device deletes one or more of the dynamic MAC addresses, to ensure that a number of static MAC addresses in a second device meets the requirement of the address number threshold after synchronization. The first device and the second device use different deletion policies to ensure that MAC addresses in the two devices after deletion are consistent, and the number of MAC addresses in each of the devices after synchronization does not exceed a MAC address number limit value configured by a user. Because the final MAC address table formed meets the requirement of the MAC address number limit configured by the user, unpredictable network transmission errors can be reduced, thereby improving the stability, reliability, and maintainability of the network.

The embodiments of the present disclosure will be further described in detail below with reference to the accompanying drawings.

Figure 1:
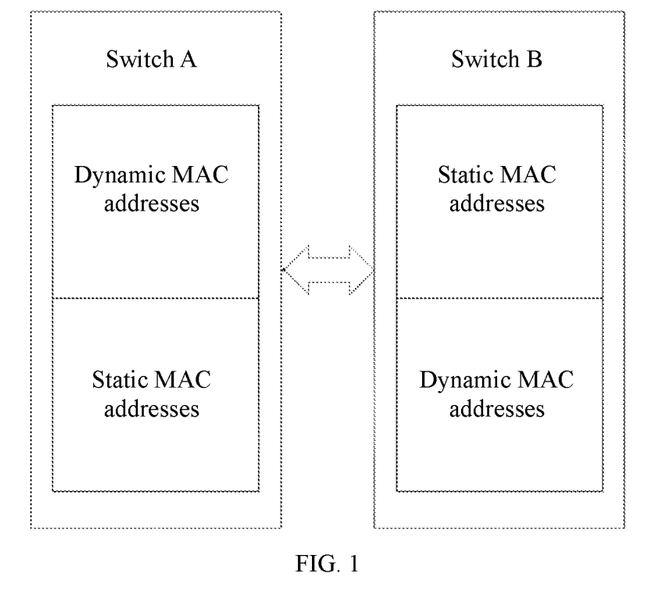
FIG. 1 is a schematic diagram of a MAC address synchronization framework of an MC-LAG switch system according to an embodiment of the present disclosure.

FIG. 1 is a schematic diagram of a MAC address synchronization framework of an MC-LAG switch system according to an embodiment of the present disclosure, describing the basic principle of MAC address synchronization in the embodiments of the present disclosure. One switch in the system learns a new MAC address, writes this MAC address into a MAC table as a dynamic MAC address, and then sends this MAC address to another switch through a peer-link interface, and the another switch writes the received MAC address into its own MAC table as a static MAC address. The static MAC address is generally configured manually by an administrator. The dynamic MAC address is formed by parsing a data frame and adding a mapping relationship between a source MAC address in the data frame and a corresponding port into a MAC table, and vice versa.

In accordance with a first aspect of the present disclosure, an embodiment provides a MAC address synchronization method. For ease of description and understanding, the first device is considered as a primary device and the second device is considered as a secondary device. However, those having ordinary skills in the art should understand that the two switch devices may not be distinguished as the primary device and the secondary device, as long as the two switch devices cooperate and execute different deletion policies.

Figure 2:
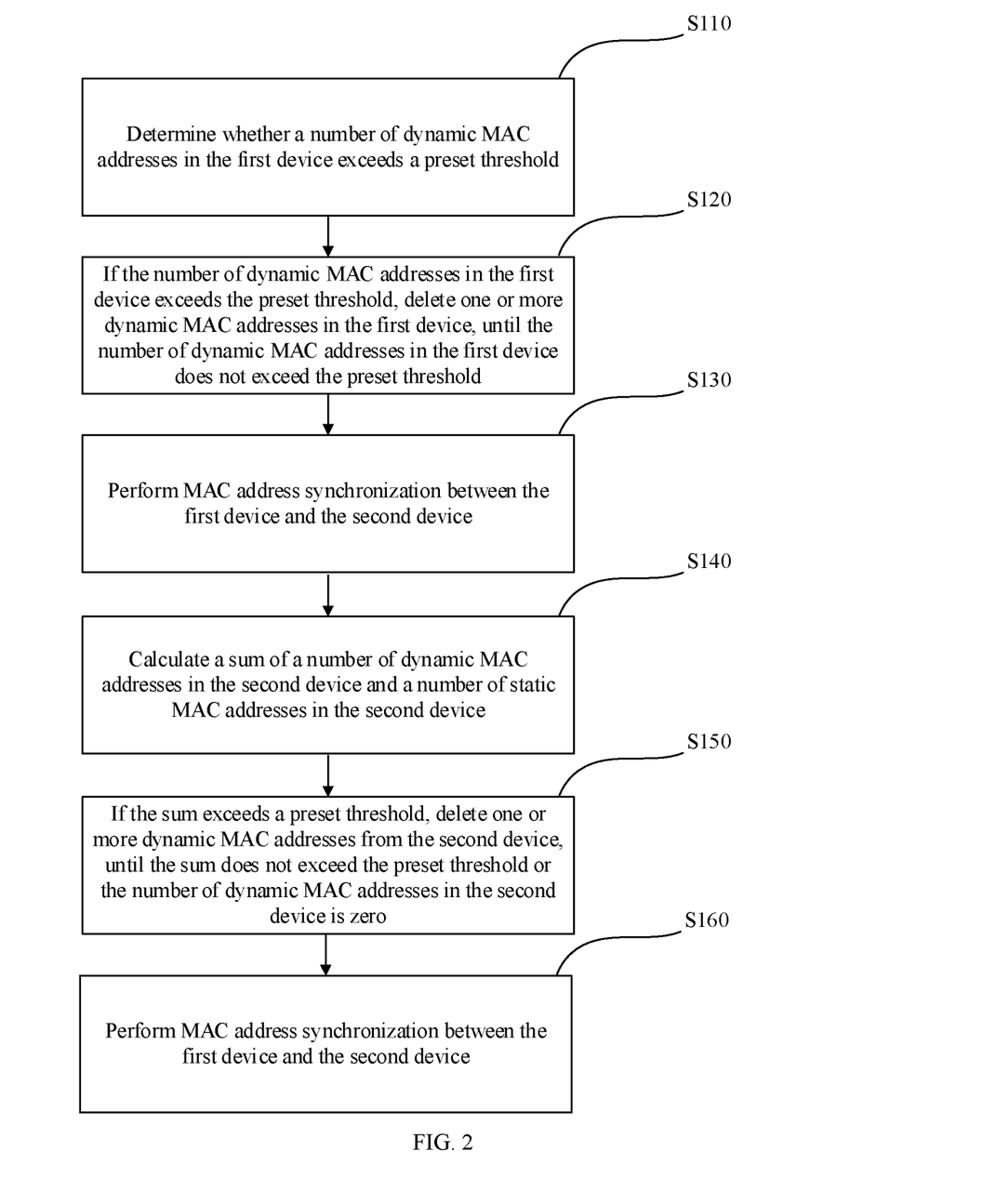
FIG. 2 is a schematic flowchart of a MAC address synchronization method according to an embodiment of the present disclosure.

FIG. 2 is a schematic flowchart of a MAC address synchronization method according to an embodiment of the present disclosure.

As shown in FIG. 2, the MAC address synchronization method provided in this embodiment at least includes the following steps S110 to S160.

At S110, it is determined whether a number of dynamic MAC addresses in the first device exceeds a threshold.

In some embodiments, the threshold may be preset. The preset threshold is an address number limit configured in the MC-LAG switch system. This step only involves determining whether the number of the dynamic MAC addresses in the first device exceeds the preset address number limit, and does not consider the number of the static MAC addresses in the first device.

At S120, if the number of the dynamic MAC addresses in the first device exceeds the threshold, one or more dynamic MAC addresses in the first device are deleted, such that the number of the dynamic MAC addresses in the first device does not exceed the threshold. In other words, if the number of the dynamic MAC addresses in the first device exceeds the threshold, one or more dynamic MAC addresses are deleted from the first device, until the number of the dynamic MAC addresses in the first device does not exceed the preset threshold.

In some embodiments, if the number of the dynamic MAC addresses in the first device exceeds the preset address number limit, one or more dynamic MAC addresses are deleted from the first device, until the number of the dynamic MAC addresses in the first device does not exceed the preset address number limit, and no deletion operation is performed on static MAC addresses in the first device.

In some embodiments, to minimize the impact on the operation of existing services, the dynamic MAC address that is learned later is preferentially deleted, i.e., the later a MAC address is learned, the more preferentially the MAC address is to be deleted, so as to avoid unpredictable interruption of the existing services as much as possible.

In some embodiments, the dynamic MAC address(es) may be deleted randomly.

At S130, MAC address synchronization is performed between the first device and the second device. To be specific, static MAC addresses in the first device and the dynamic MAC addresses in the first device that are left after deletion are synchronized to the second device. In this case, static MAC addresses in the second device correspond to the dynamic MAC addresses in the first device, and the static MAC addresses in the first device correspond to dynamic MAC addresses in the second device.

The dynamic MAC addresses in the first device are synchronized to the static MAC addresses in the second device, and the dynamic MAC addresses in the second device are synchronized to the static MAC addresses in the first device. Therefore, after the synchronization in S130, the dynamic addresses in the first device correspond to the static addresses in the second device, and the static addresses in the first device correspond to the dynamic addresses in the second device.

According to the MAC address synchronization method in this embodiment, when the number of the dynamic MAC addresses in the first device excesses the address number threshold, the first device deletes one or more of the dynamic MAC addresses. This not only ensures that the number of the dynamic MAC addresses in the first device does not exceed the address number threshold after deletion, but also ensures that the number of the static MAC addresses in the second device meets the requirement of the address number threshold after synchronization.

At S140, it is determined whether a sum of a number of dynamic MAC addresses in the second device and a number of static MAC addresses in the second device exceeds a threshold. In other words, the sum of the number of the dynamic MAC addresses in the second device and the number of the static MAC addresses in the second device is calculated, and it is determined whether the sum exceeds the preset threshold.

At S150, if the sum exceeds the threshold, one or more dynamic MAC addresses in the second device are deleted, such that the sum does not exceed the preset threshold, or the number of the dynamic MAC addresses in the second device is zero. In other words, if the sum exceeds the threshold, one or more dynamic MAC addresses are deleted from the second device, until the sum does not exceed the preset threshold, or the number of the dynamic MAC addresses in the second device is zero. The preset threshold is an address number limit configured in the MC-LAG switch system. In this step, not only the number of the dynamic MAC addresses in the second device is considered, but also it may need to be determined whether the sum of the number of the dynamic MAC addresses in the second device and the number of the static MAC addresses in the second device exceeds the preset address number limit.

In some embodiments, if the sum already exceeds the preset address number limit, the second device deletes one or more of its own dynamic MAC addresses, for example, randomly or sequentially according to an order reverse to a chronological order in which the dynamic MAC addresses are learned. The two deletion modes have no influence on the consistency of addresses after synchronization.

In some embodiments, if the number of the dynamic MAC addresses in the second device is zero, the second device stops the deletion operation.

In some embodiments, in the process of deleting the dynamic MAC addresses by the second device, when the number of the dynamic MAC addresses in the second device no longer exceeds the preset threshold, i.e., no longer exceeds the address number limit, the second device may stop the deletion operation.

In some cases, when the second device has deleted all the dynamic MAC addresses, i.e., the number of the dynamic MAC addresses in the second device is zero, the number of MAC addresses in the second device may still exceed the preset threshold, i.e., exceed the address number limit. Regarding this, the technical scheme of this embodiment can ensure that the number of the static MAC addresses in the second device does not exceed the preset threshold. In other words, when the number of the dynamic MAC addresses in the second device is zero, the number of the static MAC addresses in the second device does not exceed the preset threshold, i.e., the sum of the number of the dynamic MAC addresses in the second device and the number of the static MAC addresses in the second device does not exceed the preset threshold. Because the MAC address synchronization method used by the first device allows for the deletion of dynamic MAC addresses, the first device can ensure that the number of the dynamic MAC addresses after deletion does not exceed the preset threshold, thereby ensuring that the number of the static MAC addresses in the second device does not exceed the preset threshold after the dynamic MAC addresses in the first device are synchronized to the second device. The above process of MAC address synchronization between the first device and the second device can ensure the consistency between MAC addresses in the first device and MAC addresses in the second device and ensure that the number of MAC addresses in each of the first device and the second device does not exceed the corresponding threshold.

At S160, the MAC addresses in the second device are synchronized to the first device. To be specific, static MAC addresses in the second device and the dynamic MAC addresses in the second device that are left after deletion are synchronized to the first device. In this case, the static MAC addresses in the first device correspond to the dynamic MAC addresses in the second device, and the dynamic MAC addresses in the first device correspond to the static MAC addresses in the second device.

The dynamic MAC addresses in the second device are synchronized to the static MAC addresses in the first device, and the dynamic MAC addresses in the first device are synchronized to the static MAC addresses in the second device. Therefore, after the synchronization in S160, the dynamic addresses in the first device correspond to the static addresses in the second device, and the static addresses in the first device correspond to the dynamic addresses in the second device.

Figure 3:
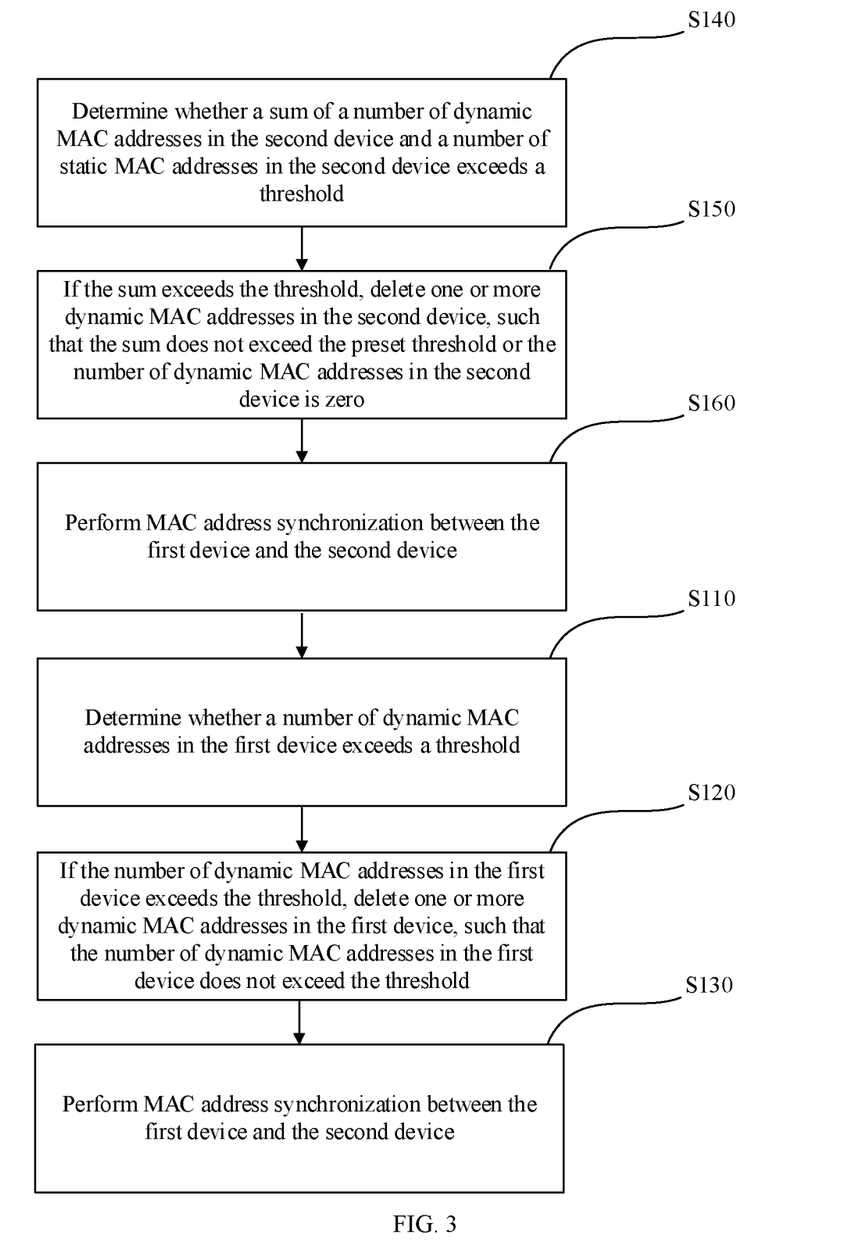
FIG. 3 is a schematic flowchart of a MAC address synchronization method according to another embodiment of the present disclosure.

FIG. 3 is a schematic flowchart of a MAC address synchronization method according to an embodiment of the present disclosure.

As shown in FIGS. 3, S140 to S160 may be executed prior to S110. Details are as follows.

At S140, it is determined whether a sum of a number of dynamic MAC addresses in the second device and a number of static MAC addresses in the second device exceeds a threshold.

At S150, if the sum exceeds the threshold, one or more dynamic MAC addresses in the second device are deleted, such that the sum does not exceed the threshold, or the number of the dynamic MAC addresses in the second device is zero.

At S160, MAC address synchronization is performed between the first device and the second device.

At S110, it is determined whether a number of dynamic MAC addresses in the first device exceeds a threshold.

At S120, if the number of the dynamic MAC addresses in the first device exceeds the threshold, one or more dynamic MAC addresses in the second device are deleted, such that the number of the dynamic MAC addresses in the second device does not exceed the threshold.

At S130, MAC address synchronization is performed between the first device and the second device.

In the steps S130 and S160, the MAC address synchronization includes synchronizing dynamic MAC addresses and static MAC addresses.

According to the MAC address synchronization method in this embodiment, the second device and the first device use different deletion policies. The first device determines whether the number of the dynamic MAC addresses in the first device exceeds the threshold, and if yes, deletes one or more of its own dynamic MAC addresses to ensure that the number of the dynamic MAC addresses in the first device does not exceed the threshold. The second device determines whether the sum of the number of the static MAC addresses in the second device and the number of the dynamic MAC addresses in the second device exceeds the threshold, and if yes, deletes one or more of its own dynamic MAC addresses to ensure that the sum of the number of the static MAC addresses in the second device and the number of the dynamic MAC addresses in the second device does not exceed the threshold. In this way, it is ensured that addresses of each of the two devices meet the requirement of the address number limit after synchronization, thereby reducing unpredictable network transmission errors and improving the stability, reliability, and maintainability of the network.

Figure 4:
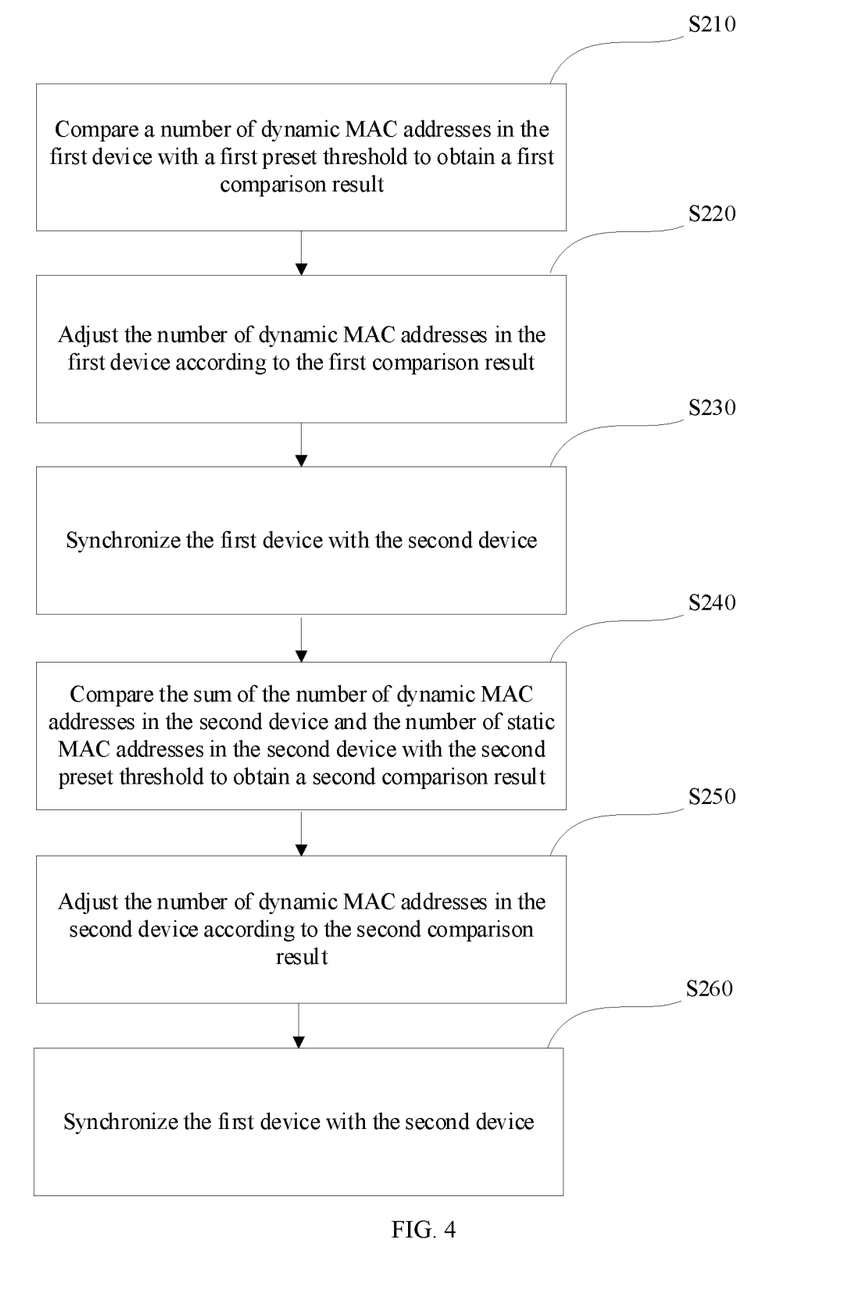
FIG. 4 is a schematic flowchart of a MAC address synchronization method according to another embodiment of the present disclosure.

FIG. 4 is a schematic flowchart of a MAC address synchronization method according to another embodiment of the present disclosure.

As shown in FIG. 4, the MAC address synchronization method provided in this embodiment at least includes the following steps S210 to S260.

At S210, a number of dynamic MAC addresses in the first device is compared with a first preset threshold to obtain a first comparison result.

In some embodiments, the first preset threshold is a maximum number of MAC addresses in the first device, i.e., a limit value of the total number of dynamic MAC addresses and static MAC addresses.

In some embodiments, the first comparison result is that the number of the dynamic MAC addresses in the first device is greater than the first preset threshold.

In some embodiments, the first comparison result is that the number of the dynamic MAC addresses in the first device is less than or equal to the first preset threshold, i.e., the number of the dynamic MAC addresses in the first device does not exceed the first preset threshold.

At S220, the number of the dynamic MAC addresses in the first device is adjusted according to the first comparison result.

In some embodiments, when the first comparison result is that the number of the dynamic MAC addresses in the first device is greater than the first preset threshold, one or more dynamic MAC addresses in the second device are deleted, such that a sum of a number of dynamic MAC addresses in the second device and a number of static MAC addresses in the second device does not exceed a threshold, or the number of the dynamic MAC addresses in the second device is zero.

In some embodiments, when the first comparison result is that the number of the dynamic MAC addresses in the first device is less than or equal to a first preset threshold, the number of the dynamic MAC addresses in the second device is kept unchanged.

At S230, the first device is synchronized with the second device. To be specific, the dynamic MAC addresses in the first device are synchronized to the static MAC addresses in the second device, and the dynamic MAC addresses in the second device are synchronized to the static MAC addresses in the first device.

At S240, the sum of the number of the dynamic MAC addresses in the second device and the number of the static MAC addresses in the second device is compared with the second preset threshold to obtain a second comparison result.

In some embodiments, the second preset threshold is a maximum number of MAC addresses in the second device, i.e., a limit value of the total number of dynamic MAC addresses and static MAC addresses.

In some embodiments, the second comparison result is that the sum of the number of the dynamic MAC addresses in the second device and the number of the static MAC addresses in the second device is greater than the second preset threshold.

In some embodiments, the second comparison result is that the sum of the number of the dynamic MAC addresses in the second device and the number of the static MAC addresses in the second device is less than or equal to the second preset threshold, i.e., does not exceed the second preset threshold.

At S250, the number of the dynamic MAC addresses in the second device is adjusted according to the second comparison result.

In some embodiments, when the second comparison result is that the sum of the number of the dynamic MAC addresses in the second device and the number of the static MAC addresses in the second device is greater than the second preset threshold, one or more dynamic MAC addresses in the second device are deleted, such that the sum of the number of the dynamic MAC addresses in the second device and the number of the static MAC addresses in the second device does not exceed the threshold, or the number of the dynamic MAC addresses in the second device is zero.

In some embodiments, when the second comparison result is that the sum of the number of the dynamic MAC addresses in the second device and the number of the static MAC addresses in the second device is less than or equal to the second preset threshold, the number of the dynamic MAC addresses in the second device is kept unchanged.

At S260, the first device is synchronized with the second device. To be specific, the dynamic MAC addresses in the first device are synchronized to the static MAC addresses in the second device, and the dynamic MAC addresses in the second device are synchronized to the static MAC addresses in the first device.

To more clearly describe the MAC address synchronization method of the embodiments of the present disclosure, the following embodiments are provided.

Figure 5:
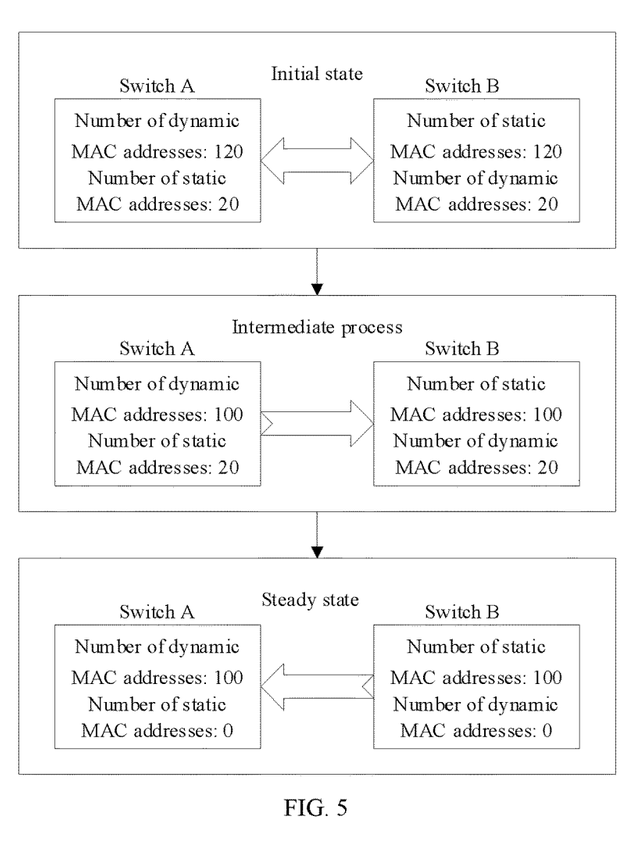
FIG. 5 is a schematic diagram of a MAC address synchronization framework of an MC-LAG switch system according to an embodiment of the present disclosure.

FIG. 5 is a schematic diagram of a MAC address synchronization framework of an MC-LAG switch system according to an embodiment.

In this embodiment, the first device is a switch A and the second device is a switch B. It is assumed that in an initial state, there are 120 dynamic MAC addresses and 20 static MAC addresses in the switch A, there are 120 static MAC addresses and 20 dynamic MAC addresses in the switch B, and a threshold for the number of MAC addresses in each switch is 100.

In this case, the switch A determines that the number of the dynamic MAC addresses in the switch A is 120 and exceeds the preset threshold of 100, and therefore begins to delete 20 dynamic MAC addresses from the switch A, to ensure that the number of the dynamic MAC addresses in the switch A does not exceed 100. The switch A synchronizes the addresses left after the deletion to the switch B. After the synchronization, the number of the static MAC addresses in the switch B becomes 100, and the number of the dynamic MAC addresses in the switch B remains unchanged, i.e., is still 20, corresponding to an intermediate process in FIG. 5.

It should be noted that the switch A may continue the deletion operation until the number of the dynamic MAC addresses in the switch A is less than the preset threshold.

The switch B determines that a sum of the number of the dynamic MAC addresses in the switch B and the number of the static MAC addresses in the switch B exceeds 100, and therefore deletes some of its dynamic MAC addresses until the sum of the number of the dynamic MAC addresses in the switch B and the number of the static MAC addresses in the switch B is equal to 100 or the number of the dynamic MAC addresses in the switch B is 0. After the deletion, only 100 static MAC addresses are left in the switch B. Then, the switch B synchronizes the MAC addresses in the switch B to the switch A, such that there are finally 100 dynamic MAC addresses left in the switch A. In this case, the number of addresses in each of the two switches meets the requirement of the preset threshold, and the addresses in the two switches correspond to each other, i.e., a final steady state is reached. In the steady state, there are 100 dynamic MAC addresses in the switch A and 100 static MAC addresses in the switch B, and the addresses in the two switches correspond to each other.

The MAC address synchronization method can solve the problem that the number of the dynamic MAC addresses exceeds the threshold in the initial state. The two devices forming the MC-LAG switch system use different deletion policies to ensure that MAC addresses in the two devices after deletion are consistent, and the number of MAC addresses in each of the devices after synchronization does not exceed a MAC address number limit value configured by a user. Because the final MAC address table formed meets the requirement of the MAC address number limit configured by the user, unpredictable network transmission errors can be reduced, thereby improving the stability, reliability, and maintainability of the network.

In some other embodiments, the step of determining whether the sum of the number of the dynamic MAC addresses in the switch B and the number of the static MAC addresses in the switch B exceeds the threshold may be performed prior to the step of determining whether the number of the dynamic MAC addresses in the switch A exceeds the threshold.

Figure 6:
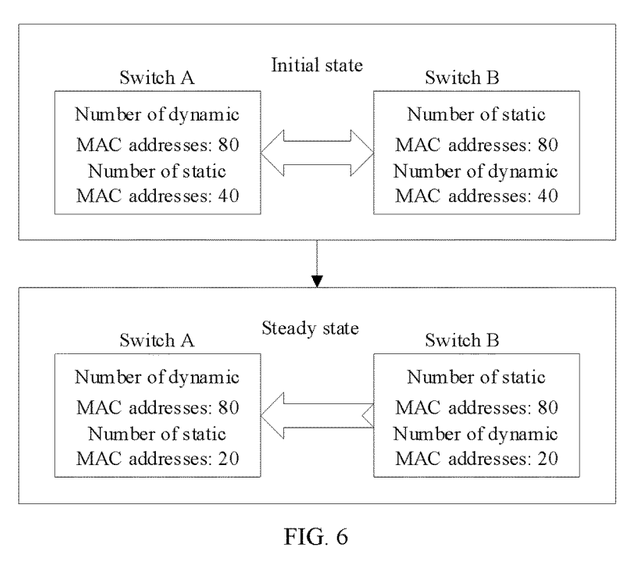
FIG. 6 is a schematic diagram of a MAC address synchronization framework of an MC-LAG switch system according to another embodiment of the present disclosure.

FIG. 6 is a schematic diagram of a MAC address synchronization framework of an MC-LAG switch system according to an embodiment.

In this embodiment, the first device is a switch A and the second device is a switch B. It is assumed that in an initial state, there are 20 static MAC addresses and 120 dynamic MAC addresses in the switch A, there are 20 dynamic MAC addresses and 120 static MAC addresses in the switch B, and a threshold for the number of MAC addresses in each switch is 100.

In this case, the switch B determines that a sum of the number of the dynamic MAC addresses in the switch B and the number of the static MAC addresses in the switch B exceeds 100, and deletes some of its dynamic MAC addresses until the sum of the number of the dynamic MAC addresses in the switch B and the number of the static MAC addresses in the switch B is equal to 100, or all the dynamic MAC addresses in the switch B have been deleted. After the deletion, 120 static MAC addresses are left in the switch B. The switch B synchronizes the MAC addresses in the switch B to the switch A. After the synchronization, all the static MAC addresses in the switch A have been deleted, and 120 dynamic MAC addresses are left in the switch A, corresponding to an intermediate process in FIG. 6.

The switch A determines that the number of the dynamic MAC addresses in the switch A is 120 and exceeds the threshold of 100, so the switch A begins to delete 20 dynamic MAC addresses.

It should be noted that the switch A may continue the deletion operation until the number of the dynamic MAC addresses in the switch A is less than the preset threshold.

The switch A synchronizes the MAC addresses in the switch A to the switch B. After the synchronization, 100 static MAC addresses are left in the switch B. In this case, the number of addresses in each of the two switches meets the requirement of the preset threshold, i.e., a final steady state is reached. In the steady state, there are 100 dynamic MAC addresses in the switch A and 100 static MAC addresses in the switch B.

Compared with the embodiment corresponding to FIG. 5, regardless whether the synchronization is performed from the switch A to the switch B or from the switch B to the switch A, the dynamic and static addresses in the switch A are consistent with those in the switch B after synchronization. In other words, in the technical scheme, the related step of the switch A determining whether the number of the dynamic MAC addresses in the switch A exceeds the threshold may be performed first, or the related step of the switch B determining whether the sum of the number of the dynamic MAC addresses in the switch B and the number of the static MAC addresses in the switch B exceeds the threshold may be performed first.

The MAC address synchronization method can solve the problem that the number of the dynamic MAC addresses exceeds the threshold in the initial state. The two devices forming the MC-LAG switch system use different deletion policies to ensure that MAC addresses in the two devices after deletion are consistent, and the number of MAC addresses in each of the devices after synchronization does not exceed a MAC address number limit value configured by a user. Because the final MAC address table formed meets the requirement of the MAC address number limit configured by the user, unpredictable network transmission errors can be reduced, thereby improving the stability, reliability, and maintainability of the network.

Figure 7:
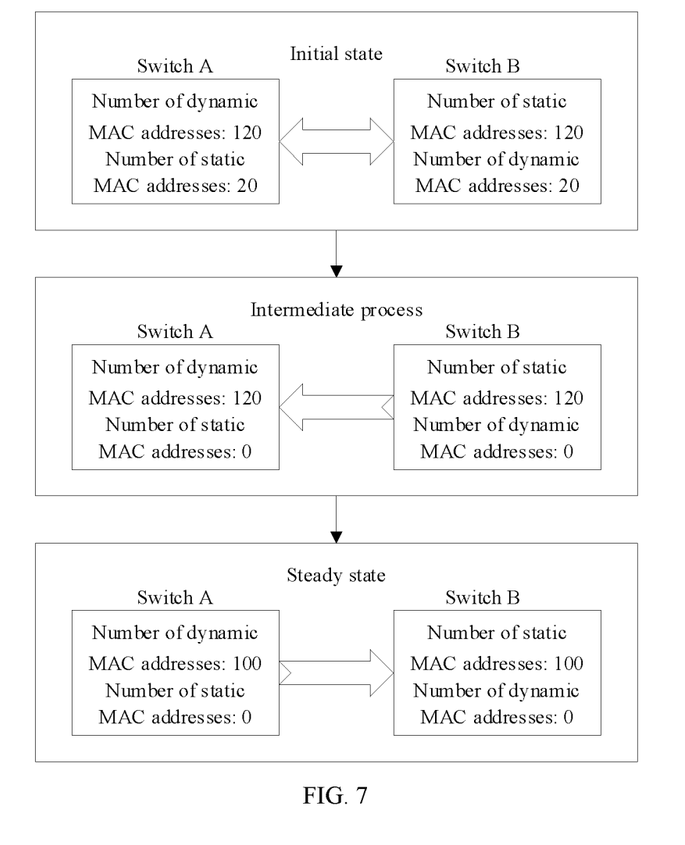
FIG. 7 is a schematic diagram of a MAC address synchronization framework of an MC-LAG switch system according to another embodiment of the present disclosure.

FIG. 7 is a schematic diagram of a MAC address synchronization framework of an MC-LAG switch system according to another embodiment.

In this embodiment, the first device is a switch A and the second device is a switch B. It is assumed that in an initial state, there are 80 dynamic MAC addresses and 40 static MAC addresses in the switch A, there are 80 static MAC addresses and 40 dynamic MAC addresses in the switch B, and a threshold for the number of MAC addresses in each switch is 100.

Because the number of the dynamic MAC addresses in the switch A is 80 and does not exceed the threshold of 100, the switch A does not perform any deletion operation.

The switch B determines that a sum of the number of the dynamic MAC addresses in the switch B and the number of the static MAC addresses in the switch B exceeds 100, and deletes some of its dynamic MAC addresses until the sum of the number of the dynamic MAC addresses in the switch B and the number of the static MAC addresses in the switch B is equal to 100. After the deletion, 80 static MAC addresses and 20 dynamic MAC addresses are left in the switch B.

It should be noted that the switch B may continue the deletion operation as needed until the sum of the number of the dynamic MAC addresses in the switch B and the number of the static MAC addresses in the switch B is less than the preset threshold.

The switch B synchronizes the MAC addresses in the switch B to the switch A. After the synchronization, 80 dynamic MAC addresses and 20 static MAC addresses are left in the switch A.

With the above process, the number of addresses on each of the two switches meets the requirement of the preset threshold, i.e., a final steady state is reached. In the steady state, there are 80 dynamic MAC addresses and 20 static MAC addresses in the switch A, and there are 80 static MAC addresses and 20 dynamic MAC addresses in the switch B.

The MAC address synchronization method can solve the problem that the number of the dynamic MAC addresses exceeds the threshold in the initial state. The two devices forming the MC-LAG switch system use different deletion policies to ensure that MAC addresses in the two devices after deletion are consistent, and the number of MAC addresses in each of the devices after synchronization does not exceed a MAC address number limit value configured by a user. Because the final MAC address table formed meets the requirement of the MAC address number limit configured by the user, unpredictable network transmission errors can be reduced, thereby improving the stability, reliability, and maintainability of the network.

An embodiment of the present disclosure provides a switch, which is configured for executing the MAC address synchronization method described above.

In some embodiments, switches are respectively configured as a primary device and a secondary device, links from the primary device and the secondary device are aggregated to form an MC-LAG switch system, the primary device executes the MAC address synchronization method of the first aspect, and the secondary device executes the MAC address synchronization method of the second aspect.

An embodiment of the present disclosure provides an MC-LAG system, including a primary device and a secondary device. The primary device includes a first memory, a first processor, and computer programs stored in the first memory and executable by the first processor which, when executed by the first processor, causes the first processor to implement the MAC address synchronization method of the embodiment corresponding to FIG. 3. Correspondingly, the secondary device includes a second memory, a second processor, and computer programs stored in the second memory and executable by the second processor which, when executed by the second processor, causes the second processor to implement the MAC address synchronization method of the embodiment corresponding to FIG. 4.

In some embodiments, the MC-LAG system is arranged in a network environment and connected to other network devices such as gateways and servers.

Figure 8:
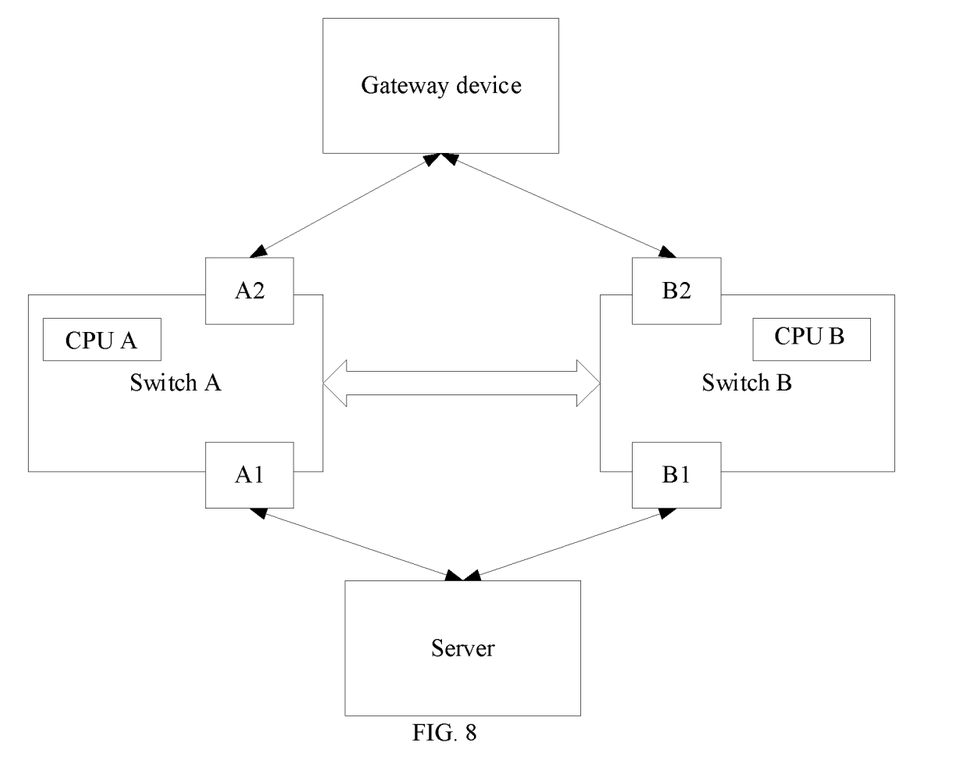
FIG. 8 is a schematic diagram of a MAC address synchronization framework of an MC-LAG switch system according to another embodiment of the present disclosure.

FIG. 8 illustrates the operating principle of MAC address synchronization of an active-active MC-LAG switch system according to an embodiment of the present disclosure. As shown in FIG. 8, switches A and B form an active-active MC-LAG switch system, with the switch A serving as a primary device and the switch B serving as a secondary device. An interface A1 of the switch A and an interface B1 of the switch B form a multi-chassis aggregated link, and are connected to a server C. A primary link C1 of the server is connected to the interface A1 of the switch A, and a secondary link C2 of the server is connected to the interface B1 of the switch B. An uplink A2 of the switch A and an uplink B2 of the switch B are connected to a gateway device G.

The switch A and the switch B in the MC-LAG switch system perform MAC address synchronization through a peer-link port.

An embodiment of the present disclosure provides a computer-readable storage medium, storing computer-executable instructions which, when executed by a processor, causes the processor to implement the MAC address synchronization method in accordance with the first aspect, or the MAC address synchronization method in accordance with the second aspect.

In the embodiments of the present disclosure, two switches forming an MC-LAG switch system use different MAC address deletion policies, such that MAC addresses in the two switches after deletion are consistent, and the number of MAC addresses in each of the switches after synchronization does not exceed a MAC address number limit value configured by a user. Because the final MAC address table formed meets the requirement of the MAC address number limit configured by the user, network transmission errors can be reduced, thereby improving the stability, reliability, and maintainability of the network.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

Those having ordinary skills in the art can understand that all or some of the steps in the methods disclosed above and the functional modules/units in the system and the apparatus can be implemented as software, firmware, hardware, and appropriate combinations thereof. In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium. The mobile terminal device may be a mobile phone, a tablet computer, a notebook computer, a handheld computer, a vehicle-mounted terminal device, a wearable device, a super mobile personal computer, a netbook, a personal digital assistant, a Customer Premise Equipment (CPE), a UFI (wireless hotspot device), etc., which is not limited in the embodiments of the present disclosure.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A Media Access Control (MAC) address synchronization method, applied to a Multi-Chassis Link Aggregation Group (MC-LAG) system comprising a first device and a second device, the method comprising:
   comparing a number of dynamic MAC addresses in the first device with a first preset threshold to obtain a first comparison result;
   adjusting the number of the dynamic MAC addresses in the first device according to the first comparison result;
   synchronizing the first device with the second device;
   comparing a sum of a number of dynamic MAC addresses in the second device and a number of static MAC addresses in the second device with a second preset threshold to obtain a second comparison result;
   adjusting the number of the dynamic MAC addresses in the second device according to the second comparison result; and
   synchronizing the first device with the second device.

2. The method of claim 1, wherein the first comparison result comprises one of:
   the number of the dynamic MAC addresses being greater than the first preset threshold; or
   the number of the dynamic MAC addresses being less than or equal to the first preset threshold.

3. The method of claim 2, wherein:
   in response to the number of the dynamic MAC addresses being greater than the first preset threshold, deleting dynamic MAC addresses in the first device, such that the number of the dynamic MAC addresses in the first device does not exceed the first preset threshold.

4. The method of claim 2, wherein:
   in response to the number of the dynamic MAC addresses being less than or equal to the first preset threshold, keeping the number of the dynamic MAC addresses in the first device unchanged.

5. The method of claim 1, wherein the second comparison result comprises one of:
   the sum of the number of the dynamic MAC addresses and the number of the static MAC addresses being greater than the second preset threshold; or
   the sum of the number of the dynamic MAC addresses and the number of the static MAC addresses being less than or equal to the second preset threshold.

6. The method of claim 5, wherein:
   in response to the sum of the number of the dynamic MAC addresses and the number of the static MAC addresses being greater than the second preset threshold, deleting the dynamic MAC addresses in the second device, such that the sum does not exceed the second preset threshold, or the number of the dynamic MAC addresses in the second device is zero.

7. The method of claim 5, wherein:
   in response to the sum of the number of the dynamic MAC addresses and the number of the static MAC addresses being less than or equal to the second preset threshold, keeping the number of the dynamic MAC addresses in the second device unchanged.

8. The method of claim 1, wherein synchronizing the first device with the second device comprises:
   synchronizing the dynamic MAC addresses in the first device to the static MAC addresses in the second device, and synchronizing the dynamic MAC addresses in the second device to the static MAC addresses in the first device.

9. A Multi-Chassis Link Aggregation Group (MC-LAG) system, comprising:
   a memory, a processor, and computer programs stored in the memory and executable by the processor which, when executed by the processor, causes the processor to perform a Media Access Control (MAC) address synchronization method, the MC-LAG system comprising a first device and a second device, the method comprising:
   comparing a number of dynamic MAC addresses in the first device with a first preset threshold to obtain a first comparison result;
   adjusting the number of the dynamic MAC addresses in the first device according to the first comparison result;
   synchronizing the first device with the second device;
   comparing a sum of a number of dynamic MAC addresses in the second device and a number of static MAC addresses in the second device with a second preset threshold to obtain a second comparison result;
   adjusting the number of the dynamic MAC addresses in the second device according to the second comparison result; and
   synchronizing the first device with the second device.

10. The system of claim 9, wherein the first comparison result comprises one of:
   the number of the dynamic MAC addresses being greater than the first preset threshold; or
   the number of the dynamic MAC addresses being less than or equal to the first preset threshold.

11. The system of claim 10, wherein:
   in response to the number of the dynamic MAC addresses being greater than the first preset threshold, deleting dynamic MAC addresses in the first device, such that the number of the dynamic MAC addresses in the first device does not exceed the first preset threshold.

12. The system of claim 10, wherein:
   in response to the number of the dynamic MAC addresses being less than or equal to the first preset threshold, keeping the number of the dynamic MAC addresses in the first device unchanged.

13. The system of claim 9, wherein the second comparison result comprises one of:
   the sum of the number of the dynamic MAC addresses and the number of the static MAC addresses being greater than the second preset threshold; or
   the sum of the number of the dynamic MAC addresses and the number of the static MAC addresses being less than or equal to the second preset threshold.

14. The system of claim 13, wherein:
   in response to the sum of the number of the dynamic MAC addresses and the number of the static MAC addresses being greater than the second preset threshold, deleting the dynamic MAC addresses in the second device, such that the sum does not exceed the second preset threshold, or the number of the dynamic MAC addresses in the second device is zero.

15. The system of claim 13, wherein:
   in response to the sum of the number of the dynamic MAC addresses and the number of the static MAC addresses being less than or equal to the second preset threshold, keeping the number of the dynamic MAC addresses in the second device unchanged.

16. The system of claim 9, wherein synchronizing the first device with the second device comprises:
   synchronizing the dynamic MAC addresses in the first device to the static MAC addresses in the second device, and synchronizing the dynamic MAC addresses in the second device to the static MAC addresses in the first device.

17. A non-transitory computer-readable storage medium, storing computer-executable instructions which, when executed by a processor, causes the processor to perform a Media Access Control (MAC) address synchronization method, the MC-LAG system comprising a first device and a second device, the method comprising:
   comparing a number of dynamic MAC addresses in the first device with a first preset threshold to obtain a first comparison result;
   adjusting the number of the dynamic MAC addresses in the first device according to the first comparison result;
   synchronizing the first device with the second device;
   comparing a sum of a number of dynamic MAC addresses in the second device and a number of static MAC addresses in the second device with a second preset threshold to obtain a second comparison result;
   adjusting the number of the dynamic MAC addresses in the second device according to the second comparison result; and
   synchronizing the first device with the second devic.

18. The non-transitory computer-readable storage medium of claim 17, wherein the first comparison result comprises one of:
   the number of the dynamic MAC addresses being greater than the first preset threshold; or
   the number of the dynamic MAC addresses being less than or equal to the first preset threshold.

19. The non-transitory computer-readable storage medium of claim 18, wherein:
   in response to the number of the dynamic MAC addresses being greater than the first preset threshold, deleting dynamic MAC addresses in the first device, such that the number of the dynamic MAC addresses in the first device does not exceed the first preset threshold.

20. The non-transitory computer-readable storage medium of claim 18, wherein:
   in response to the number of the dynamic MAC addresses being less than or equal to the first preset threshold, keeping the number of the dynamic MAC addresses in the first device unchanged.

* * * * *